Aug. 1, 1967   M. L. DAGGETT ET AL   3,333,767

CALCULATOR

Filed Oct. 23, 1965   2 Sheets-Sheet 1

INVENTORS
MYRON L. DAGGETT
& WILLIAM H. KRAUSS

BY Visek and McDonnell

ATTORNEYS

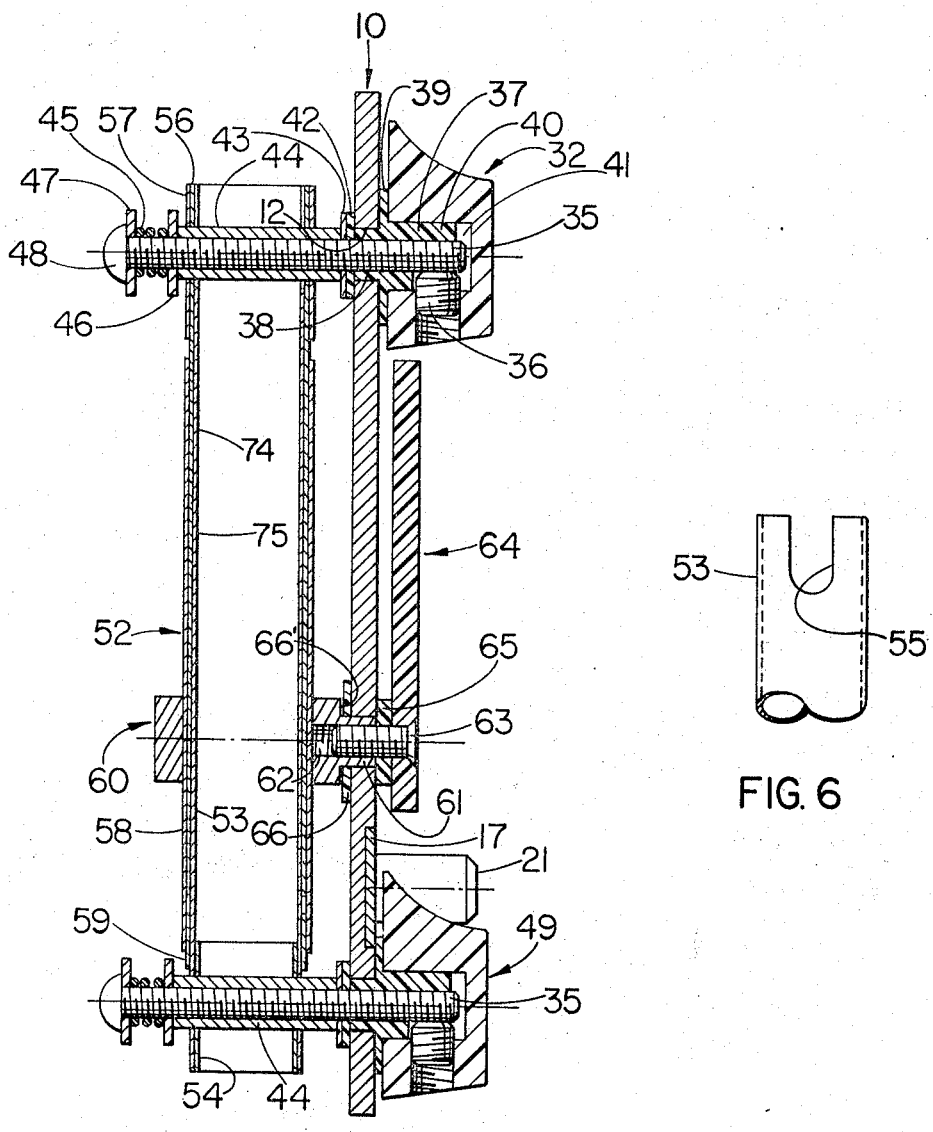

3,333,767
CALCULATOR
Myron L. Daggett, Broomall, and William H. Krauss, Media, Pa., assignors to The Boeing Company, Seattle, Wash., a corporation of Delaware
Filed Oct. 23, 1965, Ser. No. 503,191
9 Claims. (Cl. 235—61)

This invention relates to a mechanical nomographic calculator for an aircraft and, more particularly, to a calculator for indicating the maximum safe air speed of an aircraft, particularly a helicopter, at different altitudes and different temperatures with different gross weights.

During forward flight of a helicopter, the blades of a lift rotor advance into the wind on one side of the fuselage while the blades on the opposite side move downwind. Thus, the "advancing" blades provide a greater lift for the same angle of attack than the "downwind" blades because of the lower relative air speed between the "downwind" blades and the air through which they are moving in comparison with the relative air speed between the "advancing" blades and the air through which they are moving.

Unless the blades on both sides of the fuselage produce substantially the same amount of lift simultaneously, the helicopter is not capable of lateral balance. Accordingly, it is necessary for the "downwind" blades to have a higher angle of attack than the "advancing" blades to maintain the desired lateral balance of the helicopter.

As the forward air speed of a helicopter increases, the angle of attack of the "downwind" blades must be increased to maintain the lateral balance. As the angle of attack of the "downwind" blades is increased, they will reach a stall angle of attack. When this stall angle of attack occurs, control of the helicopter is lost. Thus, it is necessary to operate the helicopter at a forward air speed which is less or below that at which the "downwind" blades reach their stall angle of attack.

With a constant rotor r.p.m. and a constant rotor blade area, the forward speed at which blade stall occurs is a function of the density of the air and the gross weight of the helicopter. Thus, as the air density decreases, the angle of attack of the rotor blades must be increased to produce the same lifting force. Accordingly, the range of blade angle of attack between the average flight angle and the blade stall angle decreases with a reduction in air density.

Similarly, an increase in the gross weight of the helicopter also would result in the rotor blades stalling at a lower forward air speed because a greater lifting force is required from the rotor blades due to the greater weight. Again, the range of blade angle of attack between the average flight angle and the blade stall angle is reduced.

Since the density of air is inversely proportional to the altitude, an increase in altitude will result in a decrease in air density whereby the acceptable blade angle of attack range decreases so that the maximum safe air speed also must decrease. However, the air density also is inversely proportional to the temperature of the air. Since the temperature of the air decreases as altitude increases, the drop in temperature due to higher altitudes results in an increase in air density. Thus, the decrease in temperature of the air compensates to a degree for the increase in altitude. Accordingly, the maximum safe air speed depends upon both the flight altitude of the aircraft and the temperature of the air at the flight altitude.

While the foregoing is concerned primarily with blade stall angle, the design safety factor of the dynamic components must also be considered. That is, control forces are encountered at various speeds under varying altitude, temperature, and weight conditions; these control forces may exceed design limitations of dynamic components even before blade stall is encountered. Accordingly, while maximum safe air speed depends upon flight altitude and temperature at flight altitude under varying weight conditions, the design factor of the dynamic components may necessitate restrictions on air speed even below those which might otherwise be obtained without encountering blade stall.

While it has previously been suggested to utilize the altitude and the gross weight of a helicopter in determining the maximum safe air speed for the helicopter, the prior instrument has not compensated for temperature. Thus, the prior instrument has resulted in a lower value of maximum safe air speed than is actually permissible. The present invention satisfactorily overcomes this problem by providing a device for determining the maximum safe air speed of an aircraft in accordance with both the temperature at the flight altitude and the flight altitude of the aircraft.

The flight altitude of the aircraft is indicated by an altimeter, which is set in accordance with the barometric pressure at sea level for the area in which the helicopter is operating. Thus, the readings from the altimeter depend upon the barometric pressure at sea level to which the instrument is set. The present invention provides for changes in the barometric pressure at sea level by providing adjustment means for varying or adjusting the position of the flight altitude scale in accordance with the barometric pressure at sea level. This results in a higher value of the maximum safe air speed being obtainable than when using a fixed altitude scale, which is not adjustable in accordance with the barometric pressure at sea level.

Since the cockpits of all aircraft have many instruments utilizing the available space therein, it is necessary that any additional equipment be as compact as possible. The present invention satisfactorily meets this problem by providing a small, compact calculator, which may be conveniently mounted within easy reach of the appropriate flight crew member so as to enable quick calculation of a safe flight envelope with one hand.

Accordingly, an object of this invention is to provide a calculator for rapidly determining the maximum safe air speed of an aircraft at a flight altitude.

Another object of this invention is to provide a relatively compact calculator for use in an aircraft.

Still another object of this invention is to provide a calculator for determining a safe flight envelope necessitating a minimum amount of mental and physical attention to accomplish the determination.

A further object of this invention is to provide a mechanical calculator which provides for the efficient and accurate determination of safe flight envelopes while being instrumented in a novel compact configuration.

This invention relates to a calculator for determining a safe flight envelope. The calculator includes first movable means adapted to be positioned in accordance with a first flight envelope control factor and second movable means adapted to be positioned in accordance with a second flight envelope control factor. Connection means interconnect the first and second movable means. The connection means has third means connected thereto for indicating a third flight envelope control factor with the third means being adjustable for movement in response to movements of the first and second movable means. A fourth movable means is adapted to be positioned in accordance with a fourth flight envelope control factor for adjusting the position of at least one of the first, second, and third movable means.

The attached drawings illustrate a preferred embodiment of the invention, in which FIGURE 1 is a front elevational view of the calculator of the present invention;

FIGURE 2 is an enlarged sectional view taken along the line 2—2 of FIGURE 1;

FIGURE 6 is an enlarged side elevational view of a portion of the telescoping assembly of the present invention.

Figure 1:
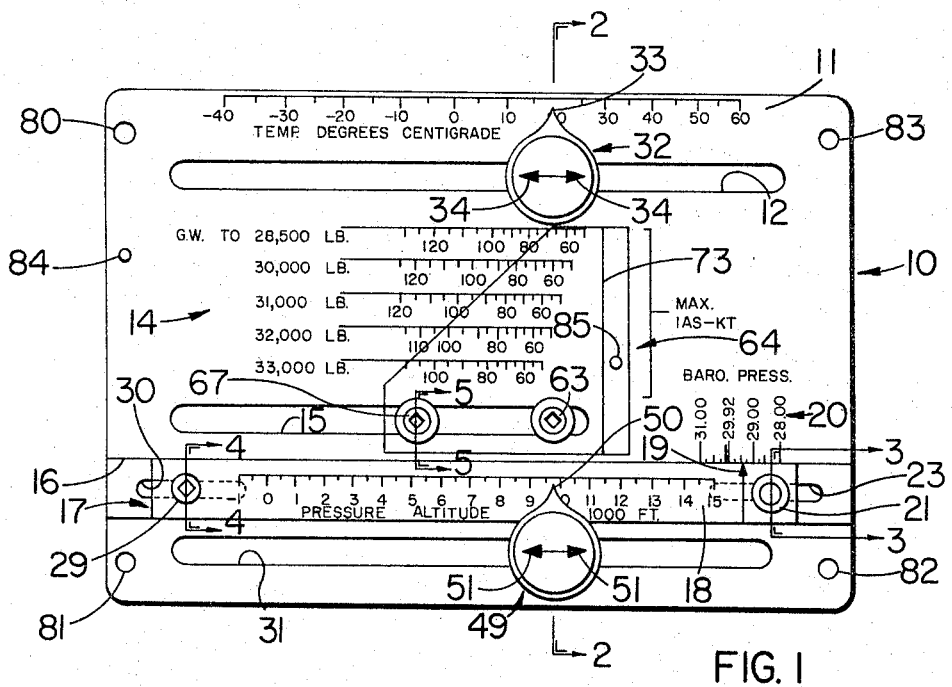

Referring to the drawings and particularly FIGURE 1, there is shown the calculator of the present invention including a support or base plate or panel 10, which is preferably formed of metal. The plate 10 has a scale 11 imprinted thereon adjacent its top. The scale 11 has non-linear spaced indicia or marks indicating degrees of temperature such as, for example, Centigrade in five degree increments.

The plate 10 has a straight slot 12 extending therethrough and disposed adjacent the scale 11. The slot 12 has its axis parallel to the top edge of the plate 10 and substantially perpendicular to each of the temperature indicia.

The center portion of the plate 10 has a scale 14 imprinted thereon. The scale 14 indicates various gross weights of the aircraft with indicia or marks indicating various air speeds of the aircraft in knots for each of a plurality of gross weights. The air speed indicia for each of the gross weights are spaced from each other according to empirical test data for the aircraft. The plate 10 has a straight slot 15, which has its axis parallel to the axis of the slot 12, disposed beneath the scale 14 and adjacent thereto. The slot 15 has its axis substantially perpendicular to the air speed indicia.

A track 16 is formed in the upper surface of the plate 10 beneath the slot 15. The track 16, which has its axis parallel to the axis of a slot 31, extends between the sides of the plate 10 as shown in FIGURE 1.

A substantially rectangularly shaped member 17 is disposed within the track 16 for sliding movement therein. The member 17 has a scale 18 imprinted thereon. The scale 18 has non-linear spaced indicia indicating the flight altitude of the aircraft in 500 feet increments.

A pointer 19 is inscribed on the sliding member 17 to the right of the scale 18 for cooperation with a scale 20, which is imprinted on the plate 10 just above the right side of the track 16. The scale 20 has equally spaced indicia indicating the barometric pressure at sea level in inches of mercury. The member 17 is movable within the track 16 by the user grasping a knob 21 until the pointer 19 aligns with the indicium or mark on the scale 20 indicating the barometric pressure at sea level in the area in which the helicopter is operating.

Figure 3:
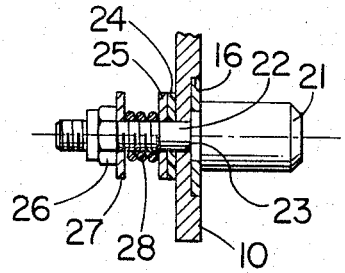
FIGURE 3 is a sectional view taken along the line 3—3 of FIGURE 1.

As shown in FIGURE 3, the knob 21 has a reduced portion 22 extending through a straight slot 23 in the right side of the plate 10. The slot 23 has its axis parallel to the axis of the slot 31 and is aligned with the axis of the track 16. The length of the slot 23 is substantially the same as the length of the scale 20 to insure that the movement of the slide member 17 within the track 16 is limited to substantially the length of the scale 20.

A pair of washers 24 and 25 surrounds the reduced portion 22 of the knob 21 with the washer 24 engaging the lower surface of the plate 10. The washer 24 is preferably formed of Teflon while the washer 25 is metal.

The reduced portion 22 of the knob 21 is threaded at its outer end to receive a nut 26. A metal washer 27 is disposed adjacent the nut 26 and has one end of a spring 28 bearing thereagainst. The spring 28, which surrounds the reduced portion 22 of the knob 21, has its other end engaging against the metal washer 25. The washer 25 distributes the spring force; if the spring force were applied directly to the washer 24, the Teflon might cold flow. By adjusting the position of the nut 26, the force of the spring 28 is adjusted to insure that the member 17 does not slide within the track 16 unless the knob 21 is moved by the user.

The left end of the member 17 has a threaded screw 29 extending therethrough and disposed within a straight slot 30 in the left side of the plate 10. The slot 30 is of the same length as the slot 23 and has its axis aligned with the axes of the slot 23 and the track 16. Thus, the axis of the slot 30 is parallel to the axis of the slot 31.

Figure 4:
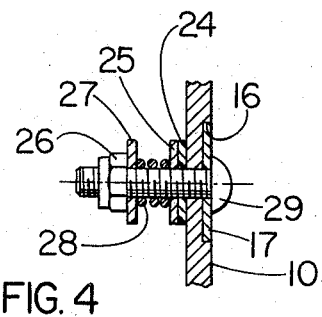
FIGURE 4 is a sectional view taken along the line 4—4 of FIGURE 1.

As shown in FIGURE 4, the same resiliently biasing structure is employed with the screw 29 as is employed with the reduced portion 22 of the knob 21. Thus, the retaining force of the slide member 17 with the track 16 is adjustable adjacent each end of the slide member 17.

The straight slot 31 is disposed adjacent and beneath the bottom of the member 17. The slot 31 is slightly shorter than the slot 12. The axis of the slot 31 is parallel to the axis of the slots 12, 15, 23, and 30.

A knob 32, which has a pointer 33 for cooperating with the indicia on the temperature scale 11, is mounted for sliding movement relative to the scale 11. Arrows 34 on the knob 32, which is preferably formed of a suitable plastic, indicate that the directions of movement of the knob 32 are along the axis of the slot 12.

The knob 32 is secured to one end of a threaded rod 35 by a set screw 36. As shown in FIGURE 2, the rod 35 extends through the slot 12.

A bushing 37, which is preferably formed of Teflon, surrounds a portion of the rod 35 and is threadedly secured thereto. The bushing 37 has a reduced portion 38, which is disposed between the top and bottom of the slot 12 and the threaded rod 35, of rectangular shape to prevent rotation in the slot 12. The bushing 37 has an enlarged shoulder 39, which is adjacent the reduced portion 38, to space the knob 32 from the upper surface of the plate 10.

The bushing 37 has a third portion 40, which has a diameter slightly larger than the reduced portion 38 but smaller than the shoulder 39, disposed within a recess 41 in the knob 32. The portion 40, which extends from the opposite side of the shoulder 39 than the reduced portion 38, is cut away on one side to allow the set screw 36 to engage the threaded rod 35 to attach the knob 32 thereto.

A pair of washers 42 and 43 surrounds the threaded rod 35 with the washer 42 abutting against the lower surface of the plate 10. A washer 42 is preferably formed of Teflon, and the washer 43 is metal.

A spacer 44, which is a hollow cylindrical member of metal, abuts against the washer 43 to urge the washer 42 into engagement with the lower surface of the plate 10. The diameter of the spacer 44 is substantially the same as the width of the reduced portion 38 of the bushing 37.

The spacer 44 is urged into engagement with the washer 43 by a spring 45, which surrounds the rod 35. The spring 45 is disposed between a metal washer 46, which abuts against the spacer 44, and a metal washer 47, which engages head 48 of the threaded rod 35.

The force of the spring 45 insures that the knob 32 is not accidentally displaced. As described with respect to the washers 24 and 25, the washer 43 distributes the spring force.

A knob 49, which has a pointer 50 cooperating with the indicia of the flight altitude scale 18, is mounted for slidable movement with respect thereto. Arrows 51 indicate that the directions of movement of the knob 49 are along the axis of the slot 31. The knob 49 is mounted in the same manner as the knob 32 so that further details are not deemed necessary and are not set forth herein.

A telescoping assembly 52 connects the knobs 32 and 49 to each other to always maintain a straight line connection therebetween irrespective of the position of the knob 32 and the position of the knob 49. The telescoping assembly 52 preferably includes an inner hollow shaft or tube 53 with a hollow support sleeve 54 attached, preferably by soldering, to its inner surface at one end thereof. The shaft or tube 53 and the sleeve 54 have aligned and diametrically opposed openings therein to permit pivotal connection with the spacer 44 and the rod 35 of the knob 49.

As shown in FIGURE 6, the shaft 53 has diametrically opposed slots 55 formed in the end remote from its pivotal connection to the rod 35 of the knob 49. These slots 55 fit around the rod 35 and the spacer 44 of the knob 32 to permit the end of the inner shaft 53 to move beyond the rod 35 of the knob 32. This is necessary so that the shaft 53 has sufficient length to insure engagement with a shaft 56 when the telescoping assembly 52 is in its fully extended position.

The hollow shaft 56 is disposed on the inner hollow shaft or tube 53 for sliding relation thereto. A support sleeve 57 is attached, preferably by soldering, to the outer surface of the shaft 56 at one end thereof.

The shaft 56 and the sleeve 57 have aligned and diametrically opposed openings therein to receive the rod 35 and the spacer 44 of the knob 32 to pivotally connect the hollow shaft 56 to the rod 35 of the knob 32. Thus, movement of either of the knobs 32 and 49 causes relative sliding movement between the hollow tubes 53 and 56 to always maintain a straight line connection between the knobs 32 and 49 irrespective of their positions.

The telescoping assembly 52 includes a hollow tube or shaft 58, which is disposed on the shaft 56 for sliding relation thereto. The hollow shaft or tube 58 has a hollow shaft or tube 59 attached, preferably by soldering, thereto. The shaft 59 is of the same diameter as the shaft 56 and slides on the inner shaft 53 of the telescoping assembly 52 to support and align the shaft 58 and the shaft 53 when the telescoping assembly 52 is extended.

The hollow shaft or tube 58 has a member 60 formed integral therewith, preferably by soldering. The member 60 has a reduced portion 61 extending into the slot 15.

The member 60 has a threaded passage 62 extending from the shaft 58 outwardly through the reduced portion 61 as shown in FIGURE 2. The threaded passage 62 receives a self-locking screw 63, which connects an indicating member 64 to the member 60. The self-locking screw 63 rotates with respect to the indicating member 64 when the telescoping assembly 52 is moved by actuation of either of the knobs 32 and 49. The indicating member 64 is formed of a transparent material, which is preferably plastic such as acrylic, for example.

A washer 65, which is preferably formed of Teflon, surrounds the screw 63 and spaces the indicating member 64 from the plate 10. A second washer 66, which is preferably formed of Teflon, surrounds the reduced portion 61 of the member 60 between a shoulder 66′ on the member 60 and the lower surface of the plate 10.

Figure 5:
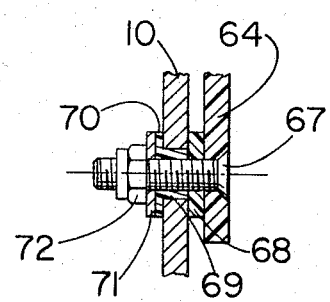
FIGURE 5 is a sectional view taken along the line 5—5 of FIGURE 1.

The indicating member 64 is also attached to the plate 10 by a screw 67, which extends through the slot 15 in the plate 10. As shown in FIGURE 5, a bushing 69, which is preferably formed of Teflon, surrounds the portion of the screw 67 extending through the slot 15 in the plate 10 and has a shoulder 70 engaging the lower surface of the plate 10.

A metal washer 71 surrounds the screw 67 and abuts against the shoulder 70 of the bushing 69. The washer 71 is held in engagement with the shoulder 70 of the bushing 69 by a self-locking nut 72, which is attached to the threaded screw 67. Thus, the screw 67 and its cooperating elements insure that the indicating member 64 is movable along the path, which is defined by the axis of the slot 15.

The indicating member 64 must not be restrained against motion along the axis of the slot 15. Thus, no springs are employed in the attachment of the indicating member 64. As shown in FIGURE 2, the reduced portion 61 of the member 60 is of greater length than the combined thicknesses of the plate 10 and the washer 66 to insure movement of the indicating member 64 in response to any movement of the telescoping assembly 52. The reduced portion of the bushing 69 is sufficiently long to insure that there is no restraint to motion of the indicating member 64 when the nut 72 is tightened on the screw 67.

The indicating member 64 has a hairline 73 (see FIGURE 1) thereon for cooperation with the air speed indicia of the scale 14. The hairline 73 is disposed substantially perpendicular to the axis of the slot 15 so as to align with the air speed indicia of the scale 14.

The screws 63 and 67 permit the indicating member 64 to be capable of moving only along the axis of the slot 15. Accordingly, the hairline 73 remains substantially perpendicular to the axis of the slot 15 throughout the movement of the indicating member 64 due to actuation of either of the knobs 32 and 49.

Since the hairline 73 cooperates with the maximum safe air speed indicia on the scale 14, the position of the indicating member 64 determines the maximum safe air speed. Various gross weights of the aircraft are indicated opposite each group of air speed indicia on the scale 14 so that the correct reading of the maximum safe air speed for any gross weight of the helicopter is readily obtained.

The axis of the slot 15 indicates air density with values increasing to the left. The specific value at the flight altitude of the air density, which is the resolution of the three variable inputs (temperature, flight, altitude, and barometric pressure at sea level), is obtained from the location of the axis of the screw 63 on the axis of the slot 15. This is transformed by proper spacing of the air speed indicia of the scale 14 and the hairline 73 into a reading of the maximum safe air speed for the helicopter for each of the gross weights set forth on the scale 14.

The spacing of the temperature indicia on the scale 11, the altitude indicia on the scale 18, and the sea level barometer pressure indicia on the scale 20 along with the distances of the slots 12 and 31 from the slot 15 are arranged so that a variation in temperature, flight altitude, or sea level barometric pressure produces the desired positioning of the screw 63 in the slot 15 to correspond with the new air density value. For example, a decrease in temperature, which occurs as altitude increases, creates an increase in air density and maximum safe air speed while an increase in alitude or a decrease in barometric pressure at sea level causes a decrease in air density and maximum safe air speed. Accordingly, the calculator of the present invention compensates for these variables.

Considering the operation of the present invention, the slide member 17 is positioned within the track 16 in accordance with the barometric pressure at sea level by aligning the pointer 19 with the indicium, which indicates the barometric pressure at sea level, on the scale 20. The springs 28 exert sufficient force to insure that the slide member 17 remains in the selected position within the track 16 while still permitting movement thereof when in the knob 21 is moved by the user.

The knob 32 is moved along the slot 12 until the pointer 33 is aligned with the temperature on the scale 11 that indicates the temperature at the desired flight altitude. The knob 49 is then moved along the slot 31 until the pointer 50 is aligned with the indicium or mark on the scale 18 indicating the flight altitude of the helicopter.

It should be understood that the slot 12 is of sufficient length to allow the pointer 33 to be movable along the entire scale 11. Likewise, the slot 31 is of sufficient length to permit the pointer 50 to be movable along the entire scale 18.

As the knob 32 is moved along the slot 12, the shaft 56 slides relative to the shaft 53 of the telescoping assembly 52 to maintain a straight line connection between the knob 32 and the knob 49. Similarly, as the knob 49 is moved along the slot 31, the hollow shaft 53 slides relative to the hollow shaft 56 of the telescoping assembly 52 to maintain a straight line connection therebetween.

During relative sliding movement of the hollow shafts 53 and 56 with respect to each other, the slots 55 may cease to contact the spacer 44 of the knob 32 depending on the amount of relative sliding movement. However, since there is no movement of the telescoping assembly 52 about its axis, the slots 55 will maintain the proper alignment with the spacer 44 of the knob 32 to easily return to the position of FIGURE 2.

Any movement of either the knob 32 in the slot 12 or the knob 49 in the slot 31 results in movement of the screw 63 along the slot 15 because the telescoping assembly 52 moves relative to the slot 15 when either of the shafts 53 and 56 moves. As a result, the indicating member 64 is moved to position the hairline 73 with respect to the air speed indicia on the scale 14. Of course, as previously mentioned, the screw 63 must rotate with respect to the indicating member 64.

When the telescoping assembly 52 is extended to its maximum length, the shaft 53 has its upper (as viewed in FIGURE 2) end moved downwardly to point 74 while the shaft 56 has its lower (as viewed in FIGURE 2) end moved upwardly to point 75. Thus, there is still contact between the two telescoping shafts 53 and 56 between the points 74 and 75 in the maximum extended position of the telescoping assembly 52. Furthermore, the sliding contact between the shaft 53 and the shaft 59 provides additional support to maintain alignment.

When the calculator of the present invention is used to determine the maximum safe air speed for a helicopter, the knob 49 is readily adjusted for any change in the flight altitude to determine the new maximum safe air speed. This allows a very rapid reading by the hairline 73. Likewise, if the temperature at the flight altitude should change, the knob 32 may be readily adjusted to indicate the new maximum safe air speed.

If the hairline 73 should move beyond the right of the air speed indicia on the scale 14 for a specific gross weight of the helicopter, this indicates that the helicopter cannot be safely operated at the flight altitude with the specific gross weight. Thus, it is necessary to select a lower flight altitude that will result in the hairline 73 extending across the air speed indicia of the scale 14 for the specific gross weight of the helicopter.

While the gross weights and maximum safe air speeds on the scale 14 have been calculated for a specific helicopter, the spacing of the indicia on the scale 14 depends on the specific aircraft on which the calculator of the present invention is to be used. This is obtained by empirical test data for each type of aircraft.

While the slots 12, 15, and 31 have been shown as straight and parallel to each other for compactness, it should be understood that the slots could have other relations to each other. Of course, the spacing of the indicia on each of the scales and the distances between the slots would have to be selected in accordance with the relation of the slots.

While the telescoping assembly 52 is shown as comprising a plurality of hollow shafts, it should be understood that only a single hollow shaft or tube could be employed if desired. In such an arrangement, the length of the hollow shaft would have to be much longer so as to extend beyond the edges of the plate 10. Thus, it would be necessary to make the plate 10 substantially larger to maintain the hollow shaft hidden therebehind or else it would protrude therefrom.

Additionally, the slots, which fit around the spacer 44 and the threaded rod 35 of the knob 32, would have to be much longer when using only a single hollow shaft. This is because it would be necessary to insure that the single hollow shaft maintains contact with the spacer 44 of the knob 32. In the telescoping assembly 52, it is not necessary for the slots 55 to maintain contact with the spacer 44 of the knob 32 at all times because contact is maintained through the hollow shaft 56.

While the pressure altitude scale 18 has been shown as adjustable through movement of the slide member 17 in accordance with the barometric pressure at sea level, the scale 18 could be fixed and not adjustable if desired. However, in such an arrangement, the pressure altitude scale 18 would have to be fixed for the normally lowest expected barometric pressure at sea level. Thus, the aircraft would be operating below rather than at its maximum safe air speed when the barometric pressure at sea level would exceed the expected minimum barometric pressure.

Naturally, the scale 18 could be fixed at any barometric pressure at sea level such as standard barometric pressure, which is 29.92 inches of mercury. However, the pilot would have to be cognizant that barometric pressures below standard barometric pressure would cause a reduction in maximum safe air speed. Thus, the pilot would have to be alert to this factor if the scale 18 were fixed at other than the lowest expected barometric pressure.

For purposes of mounting this invention, the calculator could be mounted over an opening in the control panel with the assembly 52 projecting into the opening. This could be accomplished by fasteners which attach to apertures 80, 81, 82, and 83 in the four corners of the plate 10. Another manner of mounting to structure such as the control panel is the utilization of elongated fasteners associated with the apertures 80, 81, 82, and 83 and corresponding apertures in the control panel. In this latter instance, a large aperture for assembly 52 would not be required in the control panel.

It should be understood that design changes and the like will necessitate changes or enable changes in safe flight envelopes. In such cases, the scale 14 will require change. This may be easily accomplished by the manufacture of a plate having the new scale 14 thereon and having locating apertures properly positioned so as to be placed on locating pins such as, for example, pins 84 and 85 as shown in FIGURE 1.

An advantage of this invention is that any condition, which would change the maximum safe air speed for the aircraft, may be quickly introduced in the calculator to produce a new maximum safe air speed for the new operating conditions. Another advantage of this invention is that it eliminates the need for charts and correlation between charts to determine a maximum safe air speed for an aircraft at a specific flight altitude.

Additionally, it should be understood that in some instances attainment of the highest possible safe speed may not be as important as flying at the maximum altitude possible. In such instances, the calculator can essentially be worked backwards from a known weight and known various altitude temperatures.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A calculator for determining a safe flight envelope including first movable means adapted to be positioned in accordance with a first flight envelope control factor, second movable means adapted to be positioned in accordance with a second flight envelope control factor, connection means interconnecting said first and second movable means, third means connected to said connection means for indicating a third flight envelope control factor and being adjustable for movement in response to movements of said first and second movable means, and a fourth movable means adapted to be positioned in accordance with a fourth flight envelope control factor for adjusting the position of at least one of said first, second, and third movable means.

2. A calculator for determining a safe flight envelope for an aircraft including a base means for depicting scales thereon; a first scale on said base means representing a first flight envelope control factor, a second scale on said base means representing a second flight envelope control factor, first means movable along said first scale, second means movable along said second scale, means connecting said first and said second movable means, a third scale on said base means representing a third flight envelope control factor, and means movable along said third scale, said third movable means being connected to said connecting means for movement in response to movements of said first and second movable means whereby said third movable means determines said third flight envelope control factor in cooperation with said third scale.

3. A calculator for determining a safe flight envelope for an aircraft including scale means for depicting scales thereon; a first scale on said scale means representing a first flight envelope control factor, a second scale on said scale means representing a second flight envelope control factor, first means movable along said first scale, second means movable along said second scale, means connecting said first and said second movable means, a third scale on said scale means representing a third flight envelope control factor, means movable along said third scale, said third movable means being connected to said connecting means for movement in response to movements of said first and second movable means whereby said third movable means determines said third flight envelope control factor in cooperation with said third scale, and at least one of said first, second and third scales being adjustable with respect to a fourth scale representing a fourth flight envelope control factor.

4. A calculator for determining a safe flight envelope including first means movable along a straight path and positioned in accordance with a first flight envelope control factor, second means movable along a straight path and positioned in accordance with a second flight envelope control factor, means connecting said first movable means and said second movable means together, said connecting means maintaining a straight line connection between said first movable means and said second movable means, third means attached to said connecting means intermediate said first movable means and said second movable means, means to permit said third means to move along a predetermined path in response to movement of said connecting means, means cooperating with said third means to indicate a third flight envelope control factor in accordance with the position of said third means, and means to adjust the position of one of said first, second, and third movable means in accordance with a fourth flight envelope control factor.

5. A calculator for determining a safe flight envelope including a plate having a plurality of spaced slots therein, first means movable in a first of said slots and positioned in accordance with a first flight envelope control factor, second means movable in a second of said slots and positioned in accordance with a second flight envelope control factor, means connecting said first movable means and said second movable means to each other, said connecting means maintaining a straight line connection between said first movable means and said second movable means, third means connected to said connecting means intermediate said first movable means and said second movable means, said third means being movable in a third of said slots by said connecting means, said third slot being intermediate said first slot and said second slot, means cooperating with said third means to indicate a third flight envelope control factor in accordance with the position of said third means in said third slot, and means to adjust the position of one of said first, second, and third movable means in accordance with a fourth flight envelope control factor.

6. A calculator for determining a safe flight envelope including a plate having a plurality of straight slots therein, said slots being spaced from each other in parallel relation, first means movable in a first of said slots and positioned in accordance with a first flight envelope control factor, second means movable in a second of said slots and positioned in accordance with a second flight envelope control factor, telescoping means connecting said first movable means and said second movable means to each other to maintain a straight line connection between said first movable means and said second movable means, third means connected to said telescoping means intermediate said first movable means and said second movable means, said third means being movable in a third of said slots by said telescoping means, said third slot being intermediate said first slot and said second slot, and means cooperating with said third means to indicate a third flight envelope control factor in accordance with the position of said third means in said third slot.

7. The calculator according to claim 6 in which said telescoping means includes a first hollow tube pivotally connected to one of said first movable means and said second movable means for movement therewith, a second hollow tube pivotally connected to the other of said first movable means and said second movable means for movement therewith, said second hollow tube sliding over said first hollow tube, a third hollow tube sliding over said second hollow tube, and said third hollow tube being connected to said third means.

8. A calculator for determining the maximum safe air speed of an aircraft at a flight altitude including a plate having a plurality of spaced slots therein, said plate having a temperature indicating scale adjacent a first of said slots, said plate having an altitude indicating scale adjacent a second of said slots, said altitude indicating scale being adjustable for positioning in accordance with the barometric pressure at sea level, said plate having a third scale adjacent a third of said slots, said third scale indicating various air speeds for different gross weights, said third slot being intermediate said first slot and said second slot, first means movable along said first slot, said first means having indicating means cooperating with said temperature indicating scale to position said first means in accordance with the flight altitude temperature, second means movable along said second slot, said second means having indicating means cooperating with said altitude indicating scale to position said second means in accordance with the flight altitude, means connecting said first movable means and said second movable means to each other, said connecting means maintaining a straight line connection between said first movable means and said second movable means, third means connected to said connecting means intermediate said first movable means and said second movable means, said third means being movable in said third slot by said connecting means, and said third means having indicating means cooperating with said third scale to indicate the maximum safe air speed of the aircraft for variable gross weights on said third scale in accordance with the position of said third means in said third slot.

9. A calculator for determining the maximum safe air speed of an aircraft at a flight altitude including a plate having a plurality of straight slots therein, said slots being spaced from each other in parallel relation, said plate having a temperature indicating scale adjacent a first of said slots, said plate having an altitude indicating scale adjacent a second of said slots, said indicating scale being adjustable for positioning in accordance with the barometric pressure at sea level, said plate having a third scale adjacent a third of said slots, said third scale indicating various air speeds for different gross weights, said third slot being intermediate said first slot and said second slot, first means movable along said first slot, said first means having indicating means cooperating with said temperature indicating scale to position said first means in accordance with the flight altitude temperature, second means movable along said second slot, said second means having indicating means cooperating with said altitude indicating scale to position said second means in accordance with the flight altitude, telescoping means connecting said first movable means and said second movable means to each other to maintain a straight line connection between said first movable means and said second movable means, third means connected to said telescoping means intermediate said first movable means and said second movable means, said third means being movable in said third slot by said telescoping means, and said third means having indicating means cooperating with said third scale to indicate the maximum safe air speed of the aircraft for variable gross weights on said third scale in accordance with the position of said third means in said third slot.

References Cited

UNITED STATES PATENTS

| | | | |
|---|---|---|---|
| 2,449,342 | 9/1948 | Tardif | 235—61.02 |
| 2,682,367 | 6/1954 | Friesen | 235—61.03 |
| 2,782,986 | 2/1957 | Davey | 235—61.03 |

FOREIGN PATENTS

| | | |
|---|---|---|
| 490,579 | 8/1938 | Great Britain. |
| 738,488 | 10/1955 | Great Britain. |

RICHARD B. WILKINSON, *Primary Examiner.*

STANLEY A. WAL, *Assistant Examiner.*